US012587379B2

(12) United States Patent
Chigurupati et al.

(10) Patent No.: US 12,587,379 B2
(45) Date of Patent: Mar. 24, 2026

(54) COMPUTER-BASED SYSTEMS CONFIGURED TO GENERATE A PLURALITY OF TIME-BASED DIGITAL VERIFICATION CODES AND METHODS OF USE THEREOF

(71) Applicant: Capital One Services, LLC, McLean, VA (US)

(72) Inventors: Srinivasa Chigurupati, Long Grove, IL (US); Kevin Osborn, Newton Highlands, MA (US)

(73) Assignee: Capital One Services, LLC, McLean, VA (US)

( * ) Notice: Subject to any disclaimer, the term of this patent is extended or adjusted under 35 U.S.C. 154(b) by 301 days.

(21) Appl. No.: 18/450,949

(22) Filed: Aug. 16, 2023

(65) Prior Publication Data

US 2025/0062901 A1 Feb. 20, 2025

(51) Int. Cl.
H04L 9/32 (2006.01)
H04L 9/08 (2006.01)

(52) U.S. Cl.
CPC .......... H04L 9/3213 (2013.01); H04L 9/0861 (2013.01); H04L 9/3226 (2013.01)

(58) Field of Classification Search
CPC .... H04L 9/3213; H04L 9/0861; H04L 9/3226
See application file for complete search history.

(56) References Cited

U.S. PATENT DOCUMENTS

| | | | |
|---|---|---|---|
| 8,639,629 B1 * | 1/2014 | Hoffman ............ | G06Q 20/3821 |
| | | | 705/64 |
| 9,021,601 B2 | 4/2015 | Grange et al. | |
| 11,206,131 B1 | 12/2021 | Griffin et al. | |
| 2007/0250920 A1 * | 10/2007 | Lindsay ................. | G06F 21/31 |
| | | | 726/7 |
| 2009/0235339 A1 * | 9/2009 | Mennes ............... | H04L 9/3273 |
| | | | 726/5 |
| 2014/0358777 A1 * | 12/2014 | Gueh ................. | G06Q 20/1085 |
| | | | 705/43 |
| 2018/0082283 A1 * | 3/2018 | Sharma .................. | G06Q 20/42 |
| 2020/0167793 A1 * | 5/2020 | Muralidharan ...... | G06Q 20/385 |
| 2020/0226608 A1 * | 7/2020 | Muralidharan ........ | G06Q 20/40 |
| 2022/0019995 A1 * | 1/2022 | Ngo .................. | G06Q 20/3829 |
| 2022/0383325 A1 * | 12/2022 | Hoffman ............ | G06Q 20/4018 |

* cited by examiner

*Primary Examiner* — Techane Gergiso
(74) *Attorney, Agent, or Firm* — Greenberg Traurig, LLP

(57) ABSTRACT

In some embodiments, the present disclosure provides an exemplary method that may include steps of identifying a plurality of identification numbers associated with a plurality of entities; determining at least one digital master key associated with an identification number; utilizing a derivation translation module to derive at least three digits of the plurality of digital digits associated with the digital master key; automatically generating a plurality of time-based digital tokens based on the at least three digits derived from the digital master key; utilizing at least one time-based digital token of the plurality of time-based digital tokens to generate digital data for with a computing device associated with a user; automatically generating a first card verification code associated with the at least one time-based digital token and the digital data; and automatically expiring the first card verification code after a predetermined period of time.

18 Claims, 7 Drawing Sheets

100

104

ILLUSTRATIVE PROGRAM ENGINE

DERIVATION TRANSLATION MODULE — 118

MACHINE LEARNING MODULE — 120

DATA OUTPUT MODULE

122

102

COMPUTING DEVICE

PROCESSOR — 108

NON-TRANSIENT MEMORY — 110

COMMUNICATION CIRCUITRY — 112

I/O DEVICES — 116

300

START

IDENTIFY A PLURALITY OF PARAMETERS ASSOCIATED WITH THE DIGITAL DATA — 302

ASSIGN A VALUE TO EACH IDENTIFIED PARAMETER OF THE PLURALITY OF PARAMETERS — 304

DYNAMICALLY AGGREGATE THE ASSIGNED VALUES OF EACH IDENTIFIED PARAMETER OF THE PLURALITY OF PARAMETERS ASSOCIATED WITH THE USER — 306

GENERATE THE FIRST VERIFICATION CODE — 308

END

COMPUTER-BASED SYSTEMS CONFIGURED TO GENERATE A PLURALITY OF TIME-BASED DIGITAL VERIFICATION CODES AND METHODS OF USE THEREOF

FIELD OF TECHNOLOGY

The present disclosure generally relates to computer-based systems configured to automatically generate a communication script on a computing device and methods of use thereof.

BACKGROUND OF TECHNOLOGY

Typically, spam is directed to large numbers of users for the purposes of advertising, phishing, or spreading malware. Usually, spam includes all forms of unwanted communications including, but not limited to unsolicited calls or messages, caller identification spoofing, and/or robocalls. The goal or purpose of a spam call is to sell some goods that might be unsolicited or unwanted.

SUMMARY OF DESCRIBED SUBJECT MATTER

In some embodiments, the present disclosure provides an exemplary technically improved computer-based method that includes: identifying, by a processor, a plurality of identification numbers associated with a plurality of entities, wherein each entity of the plurality of entities represents a banking institution; determining, by the processor, a digital master key associated with a identification number, wherein the digital master key is a pre-generated string of a plurality of digital digits; utilizing, by the processor, a derivation translation module to derive three digits of the plurality of digital digits associated with the digital master key; automatically generating, by the processor, a plurality of time-based digital tokens based on the three digits derived from the digital master key; utilizing, by the processor, a time-based digital token of the plurality of time-based digital tokens to generate digital data for with a computing device associated with a user, wherein the digital data is account information associated with the user; automatically calculating, by the processor, a first card verification code associated with the time-based digital token and the digital data for the computing device associated with the user; and automatically regenerating, by the processor, a second card verification code after a predetermined period of time for the computing device associated with the user.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
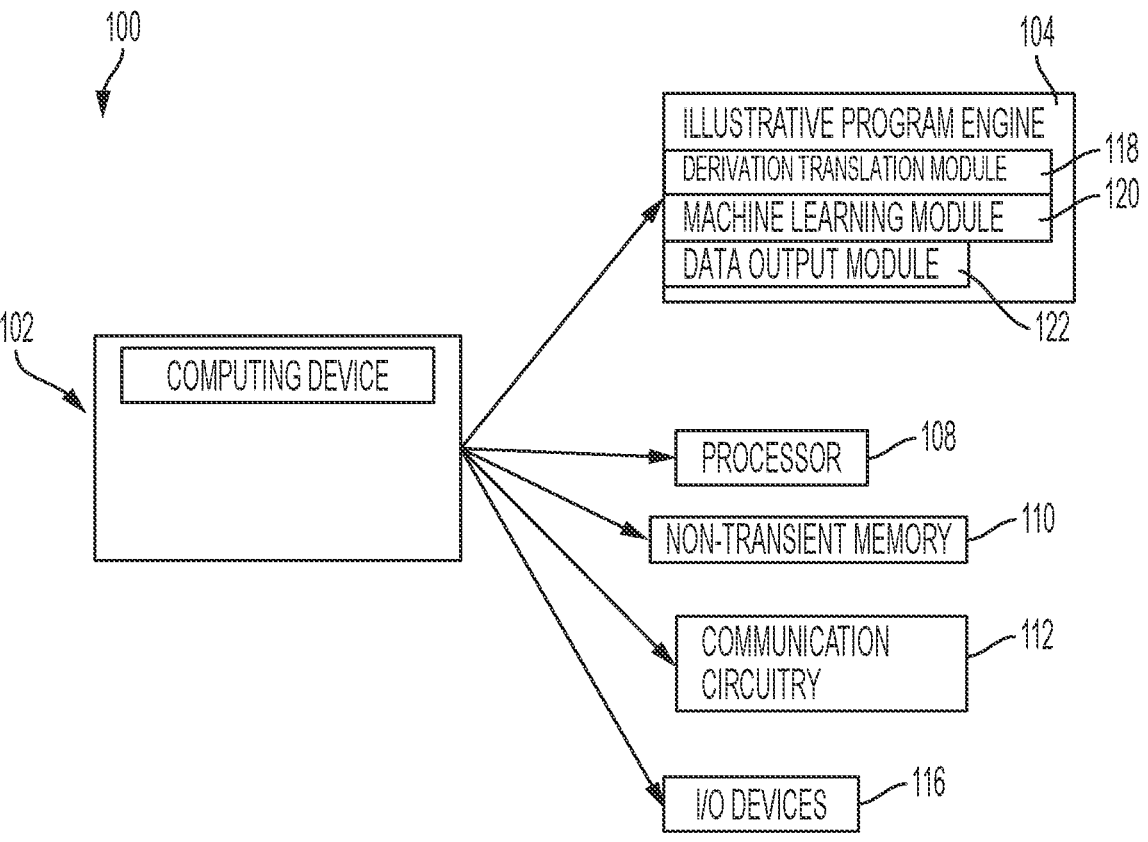
FIG. 1 depicts a block diagram of an exemplary computer-based system and platform for automatically generating a plurality of time-based digital tokens, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though they may. Furthermore, the phrases "in another embodiment" and "in some other embodiments" as used herein do not necessarily refer to a different embodiment, although they may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without human intervention. In some embodiments, events and/or actions in accordance with the present disclosure can be in real-time and/or based on a predetermined periodicity of one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or a portion of software application.

Some embodiments of the present disclosure are directed to solve a technological computer-centered problem associated with systems or processes attempting to authenticate a digital credit card in real-time. An illustrative technological computer-centered problem associated with the attempted authentication of the digital credit card in real-time typically arises when a user attempts to utilize the digital credit card to digitally purchase and/or obtain a good and/or service in real-time, which may decrease customer experience for each customer to wait until a banking institution can authenticate the digital card to account information associated with the user. As detailed in some embodiments herein, at least some technological computer-centered solutions addressing a technological computer-centered problem may be to automatically generate a plurality of time-based digital tokens based on digits derived from a digital master key. In some embodiments, the present disclosure details that one practical solution may be to utilize a time-based digital token of the plurality of time-based digital tokens to generate digital data for a digital credit card associated with the users. For example, the digital data may refer to account information associated with the user. In some embodiments, the present disclosure details that one practical solution may be to automatically generate a first card verification code associated with the time-based digital token and the digital data for the digital credit card associated with the user. For example, the digital master key may refer to a pre-generated string of multiple digital digits. In some embodiments, the present disclosure details that one practical solution may be to automatically regenerate a second card verification code after the first card verification code expired for the digital credit card associated with the user. In some embodiments, the present disclosure details that one practical solution may be to automatically expire the first card verification code after the predetermined period of time.

FIG. 1 depicts a block diagram of an exemplary computer-based system and platform for automatically generating a plurality of time-based tokens based on three digits derived from the digital master key, in accordance with one or more embodiments of the present disclosure.

In some embodiments, an illustrative computing system 100 of the present disclosure may include a computing device 102 associated with a user and an illustrative program engine 104. In some embodiments, the illustrative program engine 104 may be stored on the computing device 102. In some embodiments, the illustrative program engine 104 may be stored on the computing device 102, which may include a processor 108, a non-transient memory 110, a communication circuitry 112 for communicating over a communication network 114 (not shown), and input and/or output (I/O)

devices 116 such as a keyboard, mouse, a touchscreen, and/or a display, for example. In some embodiments, the computing device 102 may refer to a calling-enabled computing device of a plurality of calling-enabled computing devices. For example, the computing device 102 may refer to a computing device capable of transmitting, obtaining, and/or purchasing a service or good using a digital credit card.

In some embodiments, the illustrative program engine 104 may be configured to instruct the processor 108 to execute one or more software modules such as, without limitation, an exemplary derivation translation module 118, a machine learning module 120, and/or a data output module 122.

In some embodiments, an exemplary derivation translation module 118 of the present disclosure, may utilize at least one trained machine learning algorithm, described herein, to automatically generate a time-based digital token based on the three digits associated with the digital master key. In some embodiments, the exemplary derivation translation module 118 may identify a plurality of identification numbers associated with a plurality of entities. In certain embodiments, each entity of the plurality of entities may represent a banking institution. In some embodiments, the exemplary derivation translation module 118 may determine a digital master key associated with an identification number. In certain embodiments, the digital master key may refer to a cryptographic master key associated with a bank identification number. In certain embodiments, the digital master key may refer to a pre-generated string of a plurality of digital digits associated with the identification number based on an identity of the entity. In some embodiments, the exemplary derivation translation module 118 may derive the three digits of the plurality of digital digits associated with the digital master key. In certain embodiments, a derivation of the three digits of the plurality of digital digits associated with the cryptographic master key may refer to an authentication of the digital master key. In some embodiments, the exemplary derivation translation module 118 may automatically generate a plurality of time-based digital tokens based on the three digits derived from the digital master key. In some embodiments, the exemplary derivation translation module 118 may utilize the time-based digital token of the plurality of time-based digital tokens to generate digital data for a computing device 102 associated with a user. In certain embodiments, the digital data may refer to account information associated with the user. For example, the digital data may refer to account numbers, routing numbers, unique personal identification numbers, and/or security numbers (e.g., social security numbers) associated with a digital card of the user. In some embodiments, the exemplary derivation translation module 118 may automatically generate a first card verification code associated with the time-based digital token and the digital data for the computing device 102 associated with the user. In some embodiments, the exemplary derivation translation module 118 may automatically expire the first card verification code after the predetermined period of time. In some embodiments, the exemplary derivation translation module 118 may automatically regenerate a second verification code after a predetermined period of time for the computing device 102 associated with the user. In some embodiments, the exemplary derivation translation module 118 may automatically update a pre-generated database of data records associated in response to generating the plurality of time-based digital tokens. In some embodiments, the exemplary derivation translation module 118 may utilize a graphical user interface ("GUI") to display the plurality of time-based digital tokens on the computing device 102.

In some embodiments, the present disclosure describes systems for automatically utilizing the at least one trained machine learning algorithm/model of a plurality of trained machine learning algorithms within the machine learning module 120 that may identify a plurality of identification numbers associated with the plurality of entities. In some embodiments, the machine learning module 120 may determine a digital master key associated with the identification number. In some embodiments, the machine learning module 120 may utilize the exemplary derivation translation module 118 to derive the three digits of the plurality of digital digits associated with the digital master key. In some embodiments, the machine learning module 120 may automatically generate a plurality of time-based digital tokens based on the three digits derived from the digital master key. In some embodiments, the machine learning module 120 may utilize the time-based digital token of the plurality of time-based digital tokens to generate digital data for the computing device 102 associated with the user. In some embodiments, the machine learning module 120 may automatically generate a first card verification code associated with the time-based digital token and the digital data for the computing device 102 associated with the user. In some embodiments, the machine learning module 120 may automatically regenerate a second card verification code after a predetermined period of time for the computing device 102 associated with the user. In some embodiments, the machine learning module 120 may automatically update the pregenerated database of data records associated with the digital data in response to generating the plurality of time-based digital tokens.

In some embodiments, the data output module 122 may determine the digital master key associated with an identification number. In some embodiments, the data output module 122 may derive the three digits associated with the digital master key. In some embodiments, the data output module 122 may automatically generate a plurality of time-based digital tokens based on the three digits derived from the digital master key. In some embodiments, the data output module 122 may generate digital data associated with the user. In some embodiments, the data output module 122 may automatically generate a first card verification code associated with the time-based digital token and the digital data associated with the user. In some embodiments, the data output module 122 may automatically regenerate a second card verification code after the first card verification code expires.

In some embodiments, the illustrative program engine 104 may identify a plurality of identification numbers associated with a plurality of entities, where each entity represents an institution. In some embodiments, the illustrative program engine 104 may determine a digital master key associated with an identification number, where the digital master key may refer to a pre-generated string of multiple digital digits. In some embodiments, the illustrative program engine 104 may utilize the exemplary derivation translation module 118 to derive the three digits associated with the digital master key. In some embodiments, the illustrative program engine 104 may automatically generate a plurality of time-based digital tokens based on the three digits derived from the digital master key. In some embodiments, the illustrative program engine 104 may utilize a time-based digital token of the plurality of time-based digital tokens to generate digital data associated with a user, where the digital data may refer to account information associated with the user. In some embodiments, the illustrative program engine 104 may automatically generate a first card verification code associated with the time-based digital token and the digital data associated with the user. In some embodiments, the illustrative program engine 104 may automatically regenerate a second card verification code after the first card verification code expires.

In some embodiments, the non-transient memory 110 may store a plurality of identification numbers associated with the plurality of entities. In some embodiments, the non-transient memory 110 may store the digital master key associated with the identification number. In some embodiments, the non-transient memory 110 may store the derived three digits associated with the digital master key. In some embodiments, the non-transient memory 110 may store the plurality of time-based digital tokens based on the three digits derived from the digital master key. In some embodiments, the non-transient memory 110 may store the digital data associated with a user. In some embodiments, the non-transient memory 110 may store the first card verification code associated with the time-based digital token and the digital data associated with the user. In some embodiments, the non-transient memory 110 may store the second card verification code after the first card verification code expires.

Figure 2:
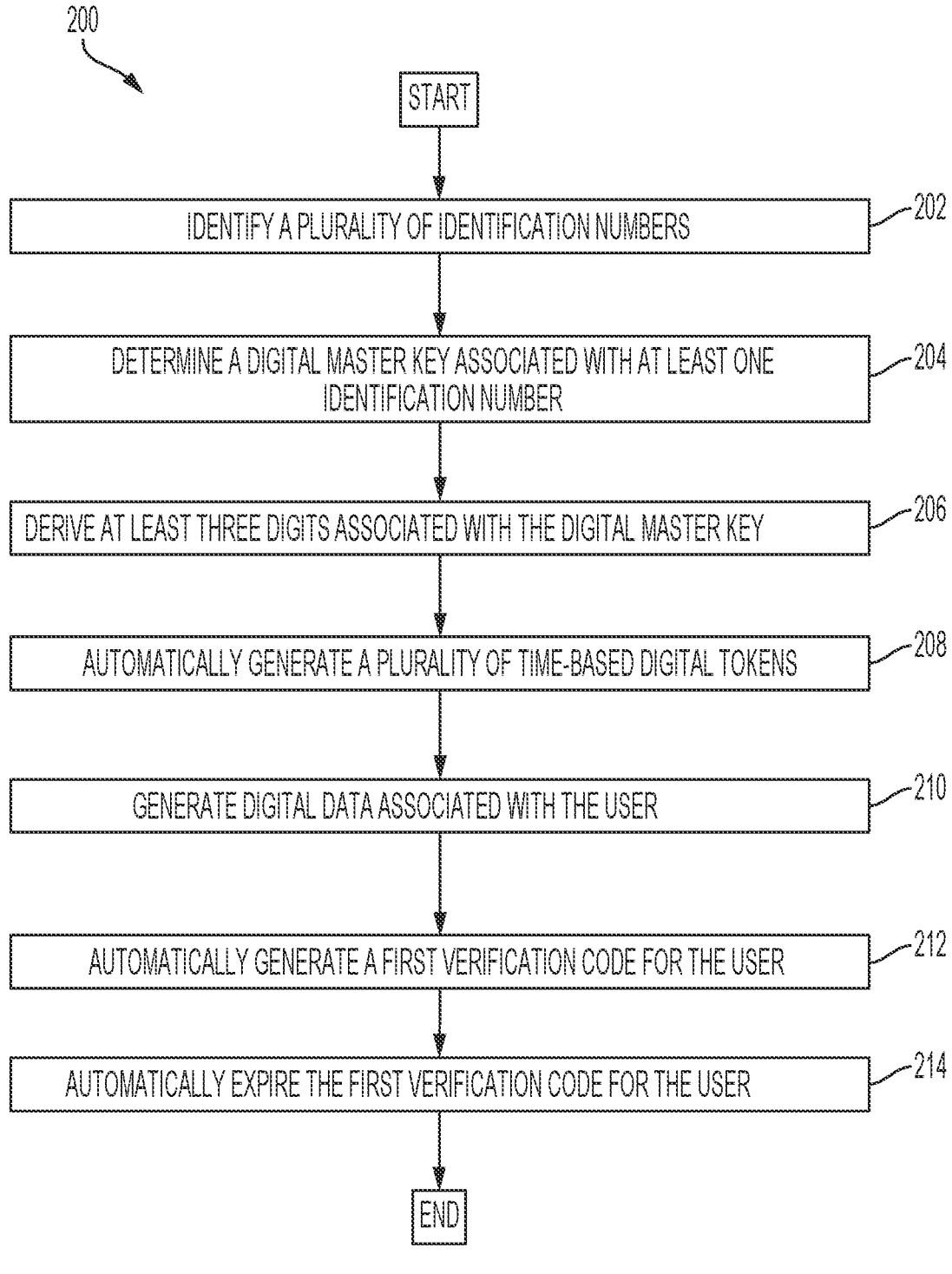
FIG. 2 is a flowchart illustrating operational steps of automatically generating a plurality of time-based digital tokens, in accordance with one or more embodiments of the present disclosure.

FIG. 2 is a flowchart 200 illustrating operational steps for automatically generating a plurality of time-based digital tokens, in accordance with one or more embodiments of the present disclosure.

In step 202, the illustrative program engine 104 of the computing device 102 may identify a plurality of identification numbers. In some embodiments, the illustrative program engine 104 may identify a plurality of identification numbers associated with a plurality of entities. In certain embodiments, each entity of the plurality of entities may represent a banking institution. For example, the illustrative program engine 104 may identify an identification number associated with Capital One. In some embodiments, the exemplary derivation translation module 118 may identify the plurality of identification numbers associated with the plurality of entities.

In step 204, the illustrative program engine 104 may determine a digital master key associated with the identification number. In some embodiments, the illustrative program engine 104 determine the digital master key associated with the identification number. In certain embodiments, the digital master key may refer to a pre-generated sting of digital digits that are unique to an individual, a banking institution, and/or a digital credit card associated with either the individual or the banking institution. In some embodiments, the exemplary derivation translation module 118 may determine the digital master key associated with the identification number.

In step 206, the illustrative program engine 104 may derive the three digits associated with the digital master key. In some embodiments, the illustrative program engine 104 may utilize the exemplary derivation translation module 118 to derive the three digits associated with the digital master key. In certain embodiments, the derived three digits may be used to distinguish a digital card associated with a user from a plurality of other digital cards associated with a plurality of users. For example, the derived three digits associated with the digital master key may refer to a unique personal identification number associated with the user at a predetermined period of time. In some embodiments, the exemplary derivation translation module 118 may derive the three digits associated with the digital master key.

In step 208, the illustrative program engine 104 may automatically generate a plurality of time-based digital tokens. In some embodiments, the illustrative program engine 104 may automatically generate the plurality of time-based digital tokens based on the three digits derived from the digital master key. In certain embodiments, a time-based digital token may refer to a digital representation of value or rights offered and sold for the purpose of facilitating access to, participation in, or development of a distributed ledger, blockchain, or other digital data structure. In some embodiments, the exemplary derivation translation module 118 may automatically generate the plurality of time-based digital tokens based on the three digits derived from the digital master key.

In step 210, the illustrative program engine 104 may generate digital data associated with the user. In some embodiments, the illustrative program engine 104 may utilize a time-based digital token of the plurality of time-based digital tokens to generate the digital data associated with the user. In certain embodiments, the digital data may refer to is account information associated with the user. In some embodiments, the illustrative program engine 104 may utilize the time-based digital token of the plurality of time-based digital tokens to generate the digital data for a digital card associated with the user. In some embodiments, the exemplary derivation translation module 118 may utilize the time-based digital token of the plurality of time-based digital tokens to generate the digital data associated with the user.

In step 212, the illustrative program engine 104 may automatically generate a first verification code for the user. In some embodiments, the illustrative program engine 104 may automatically generate the first verification code associated with the time-based digital token and the digital data associated with the user. In certain embodiments, the first verification code may refer to a first card verification code associated with the digital card for the user. In some embodiments, the illustrative program engine 104 may automatically generate the first verification code associated with the time-based digital token and the digital data associated with the user by identifying a plurality of parameters associated with the digital data based on a plurality of received preferences associated with the user; assigning a value to each identified parameter of the plurality of parameters based on a predetermined scale; dynamically aggregating the assigned values of each identified parameter of the plurality of parameters associated with the user; and generating the first verification code based on the dynamic aggregation of the assigned values of the plurality of parameters associated with the user. In some embodiments, the exemplary derivation translation module 118 may automatically generate the first verification code associated with the time-based digital token and the digital data associated with the user.

In step 214, the illustrative program engine 104 may automatically expire the first card verification code after the predetermined period of time. In some embodiments, the engine 104 may automatically regenerate a second verification code. In some embodiments, the illustrative program engine 104 may automatically regenerate the second verification code after the first verification code expires. In some embodiments, the illustrative program engine 104 may automatically regenerate a second card verification after the first card verification code expires for the digital card associated with the user. In some embodiments, the exemplary derivation translation module 118 may automatically regenerate the second verification code after the first verification code expires. In some embodiments, the illustrative program engine 104 may automatically display via a graphical user interface with a plurality of programmable elements the plurality of time-based digital tokens on the computing device 102 associated with the user. In some embodiments, the exemplary derivation translation module 118 may automatically display via a graphical user interface with a plurality of programmable elements the plurality of time-based digital tokens on the computing device 102 associated with the user. In some embodiments, the illustrative program engine 104 may automatically update a pre-generated database of data records associated with the digital data in response to generating the plurality of time-based tokens. In certain embodiments, the pre-generated database of data records may refer to a database maintained by the financial institution of the plurality of entities. In some embodiments, the exemplary derivation translation module 118 may automatically update the pre-generated database of data records associated with the digital data in response to generating the plurality of time-based tokens.

Figure 3:
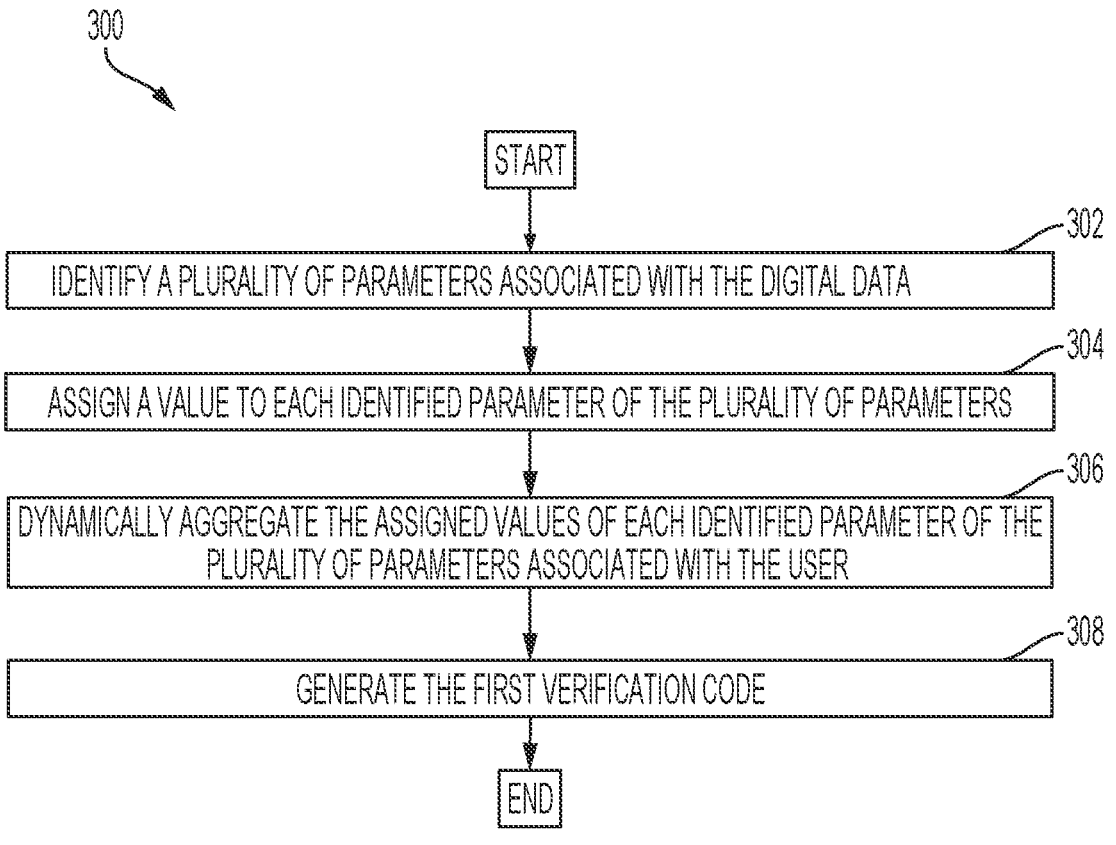
FIG. 3 is a flowchart illustrating operational step of automatically calculating a first card verification code associated with the time-based digital toke and digital data, in accordance with one ore more embodiments of the present disclosure.

FIG. 3 is a flowchart 300 illustrating operational steps of automatically calculating the first verification code associated with the time-based digital token and the digital data associated with the user, in accordance with one or more embodiments of the present disclosure.

In step 302, the illustrative program engine 104 may identify a plurality of parameters associated with the digital data. In some embodiments, the illustrative program engine 104 may identify the plurality of parameters associated with the digital data based on a plurality of received preferences associated with the user. In certain embodiments, the plurality of parameters may refer to preferences associated with the user's pattern of purchase history and/or financial intuitions associated with the account information of the user. In some embodiments, the exemplary derivation translation module 118 may identify the plurality of parameters associated with the digital data based on a plurality of received preferences associated with the user.

In step 304, the illustrative program engine 104 may assign a value to each identified parameter of the plurality of parameters. In some embodiments, the illustrative program engine 104 may assign the value to each identified parameter of the plurality of parameters based on a predetermined scale. In certain embodiments, the predetermined scale may refer to a range with a minimum value of one and a maximum value of five based on a match to each preference of the plurality of preferences associated with the user. In some embodiments, each match may be based on a positive identification between a parameter and a user preference. In some embodiments, the exemplary derivation translation module 118 may assign the value to each identified parameter of the plurality of parameters based on the predetermined scale.

In step 306, the illustrative program engine 104 may dynamically aggregate the assigned values of each identified parameter of the plurality of parameters associated with the user. In some embodiments, the illustrative program engine 104 may dynamically aggregate the assigned values of each positive match between the plurality of identified parameters and the plurality of preferences associated with the user. In some embodiments, the exemplary derivation translation module 118 may dynamically aggregate the assigned values of each positive match between the plurality of identified parameters and the plurality of preferences associated with the user.

In step 308, the illustrative program engine 104 may generate the first verification code. In some embodiments, the illustrative program engine 104 may generate the first verification code based on the dynamic aggregation of the assigned values of the plurality of parameters associated with the user. In some embodiments, the exemplary derivation translation module 118 may generate the first verification code based on the dynamic aggregation of the assigned values of the plurality of parameters associated with the user.

Figure 4:
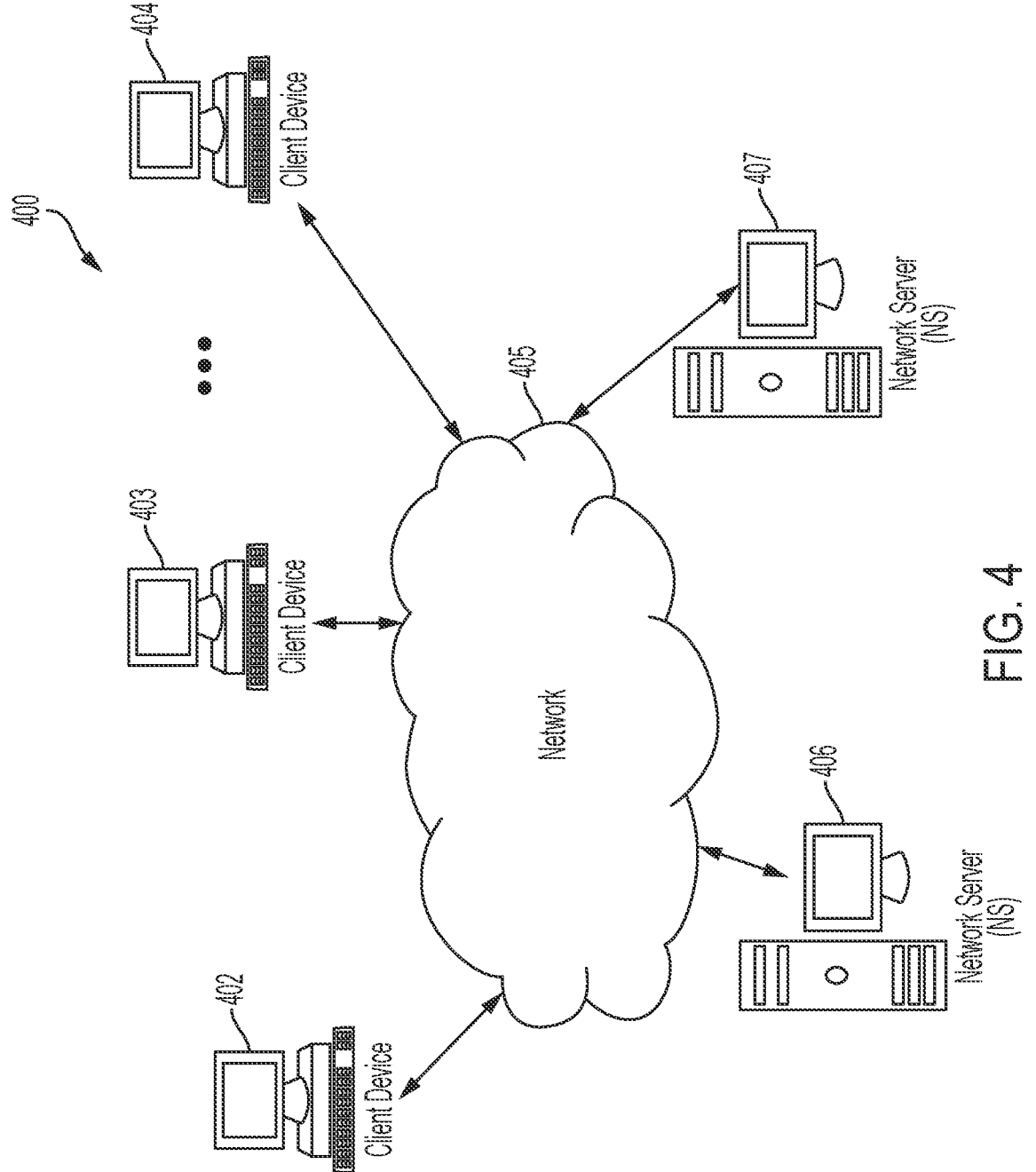
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to utilize a time-based digital token of the plurality of time-based digital tokens to generate digital data for with a computing device 102 associated with a user and automatically generate a first verification code associated with the time-based digital token and the digital data for the computing device 102 associated with the user, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to remotely execute the instructions associated with the exemplary script generation module 118 of the present disclosure, automatically utilizing a machine-learning model described herein.

In some embodiments, referring to FIG. 4, member devices 402-404 (e.g., client devices) of the exemplary computer-based system/platform 400 may include virtually any computing device capable of utilizing a time-based digital token of the plurality of time-based digital tokens to generate digital data for with a computing device 102 associated with a user and automatically calculating a first verification code associated with the time-based digital token and the digital data for the computing device 102 associated with the user via a network (e.g., cloud network 109), such as network 405, to and from another computing device, such as servers 406 and 407, each other, and the like. In some embodiments, the member devices 402-404 may be smart phones, personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, the exemplary derivation translation module 118 of the present disclosure may be configured to automatically regenerate a second card verification code after a predetermined period of time for the computing device 102 associated with the user and employ virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to utilize at least one time-based digital token of the plurality of time-based digital tokens to generate digital data for with a computing device 102 associated with a user and automatically generate a first verification code associated with the at least one time-based digital token and the digital data for the computing device 102 associated with the user.

Figure 5:
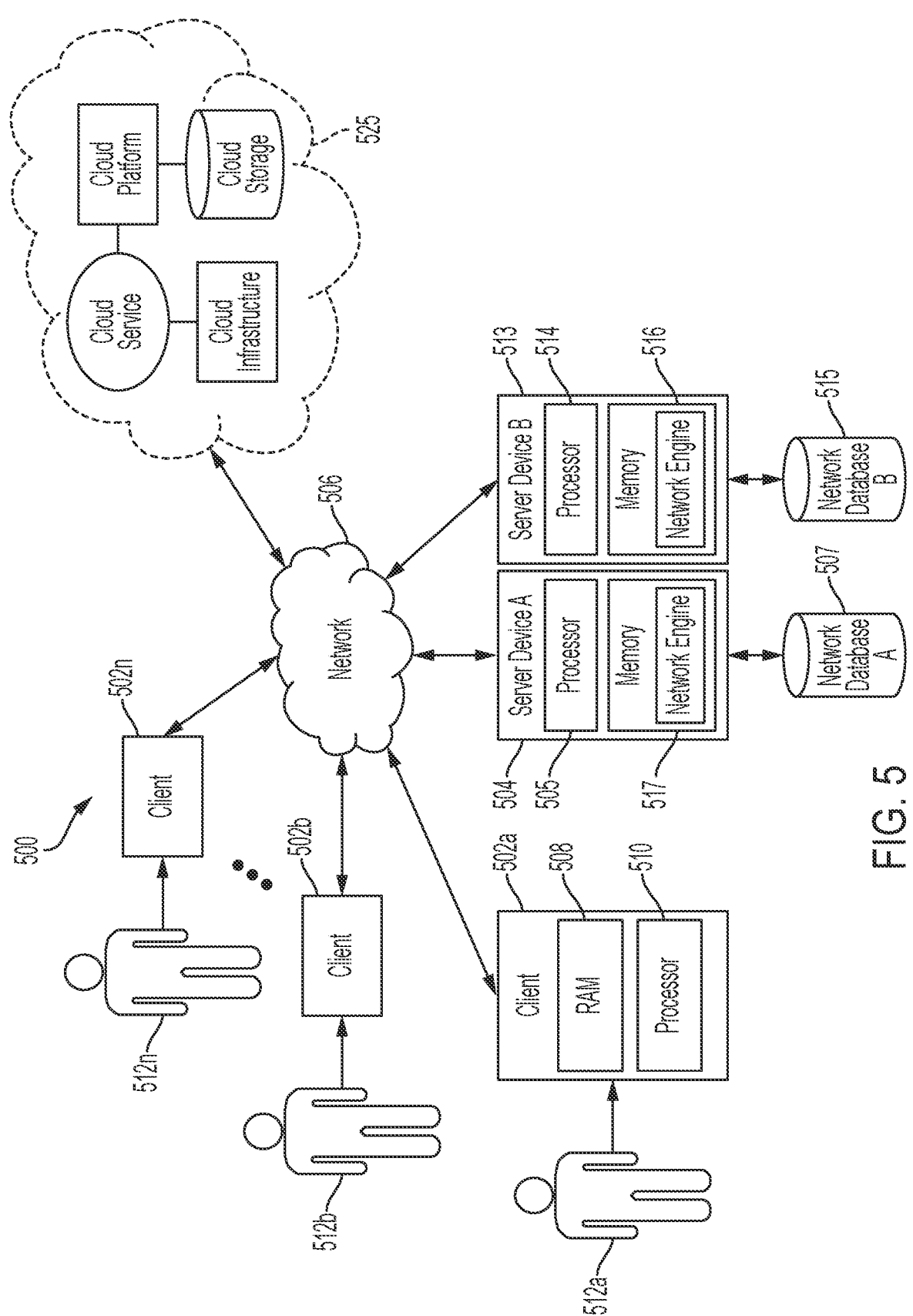
FIG. 5 depicts a block diagram of another exemplary computer-based system/platform in accordance with one or more embodiments of the present disclosure

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502*a*, 502*b* thru 502*n* shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502*a*, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502*a* through 502*n* may also comprise a number of external or internal devices such as a mouse, a CD-ROM, DVD, a physical or virtual keyboard, a display, a speaker, or other input or output devices. In some embodiments, examples of member computing devices 502*a* through 502*n* (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502*a* through 502*n* may be specifically programmed with one or more application programs in accordance with one or more principles/methodologies detailed herein. In some embodiments, member computing devices 502*a* through 502*n* may operate on any operating system capable of supporting a browser or browser-enabled application, such as Microsoft™, Windows™, and/or Linux. In some embodiments, member computing devices 502*a* through 502*n* shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502*a* through 502*n*, users, 512*a* through 512*n*, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502*a* through 502*n* may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
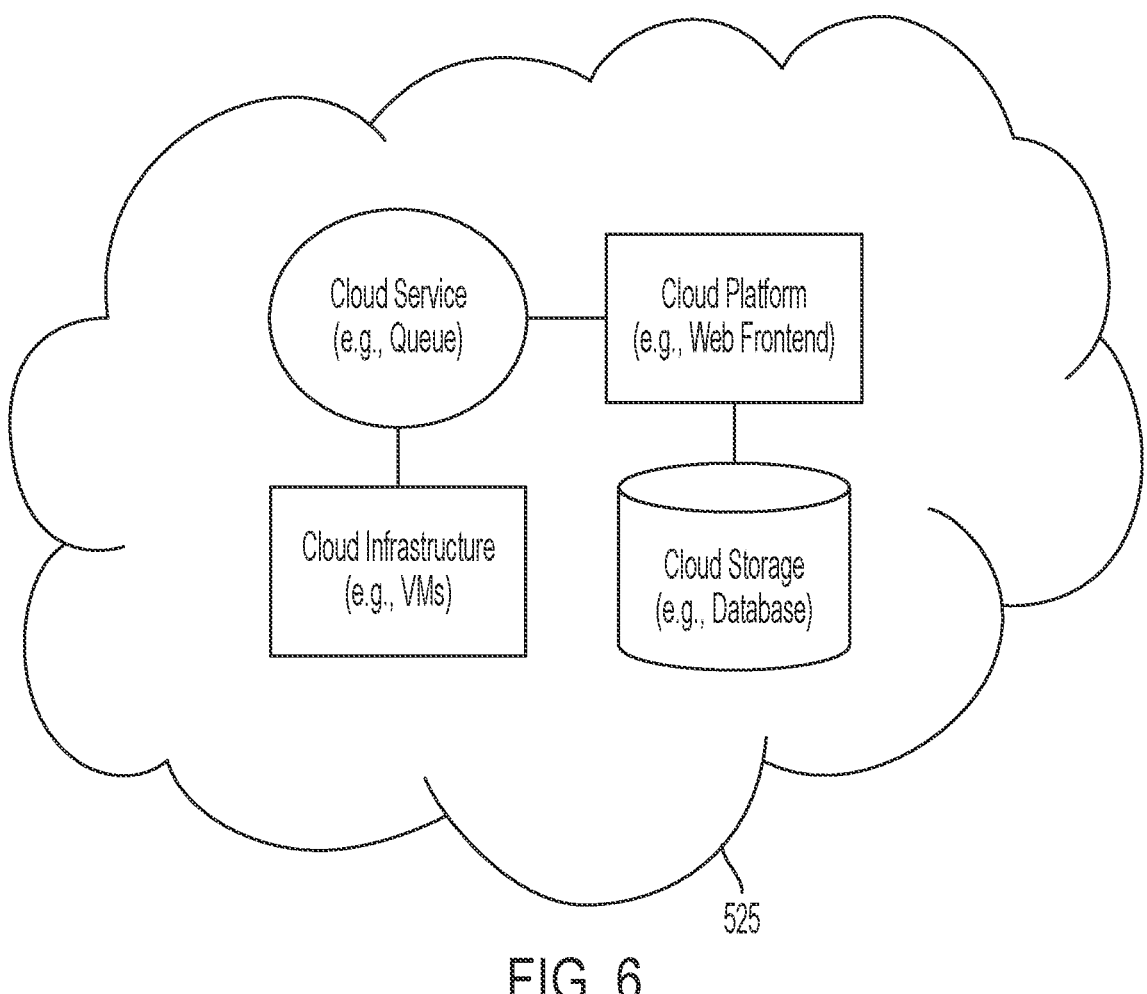
FIGS. 6 and 7 are diagrams illustrating implementations of cloud computing architecture/aspects with respect to which the disclosed technology may be specifically configured to operate, in accordance with one or more embodiments of the present disclosure.
Figure 7:
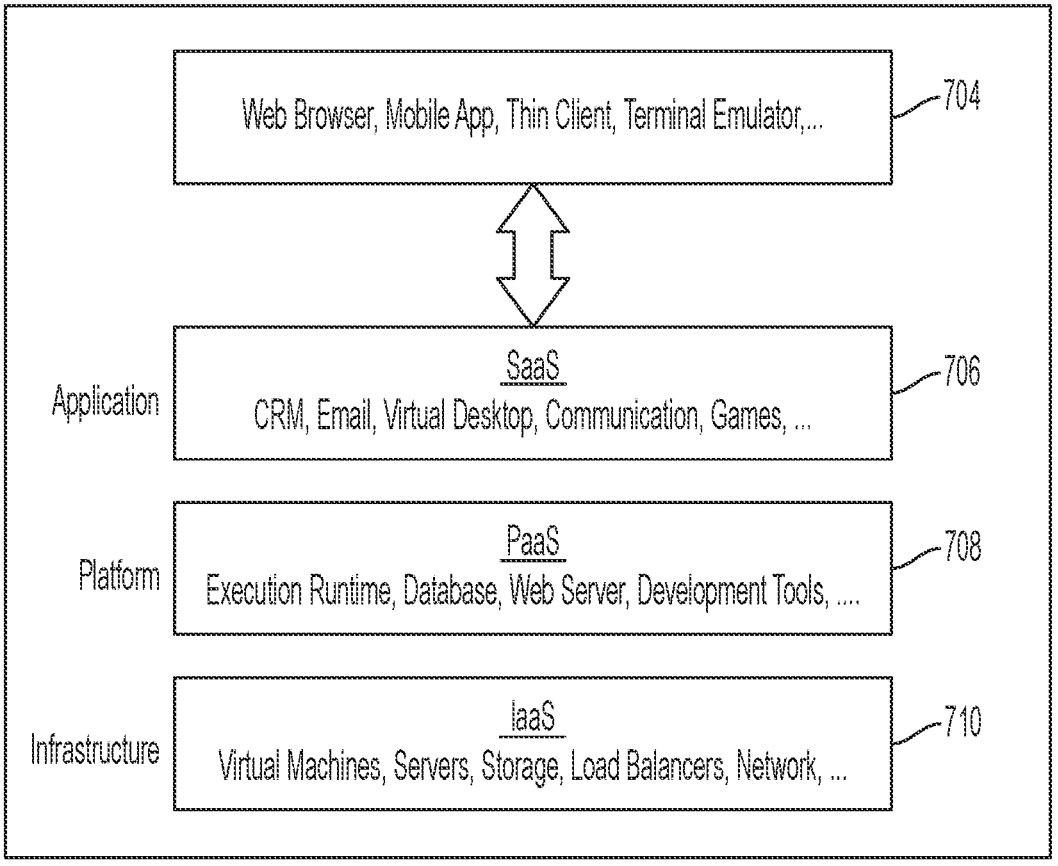

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS) 710, platform as a service (PaaS) 708, and/or software as a service (SaaS) 706.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices;

electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile;™ (20) Microsoft DirectX™; (21).NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary spam prevention module 118 of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary spam prevention module 118 of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

The aforementioned examples are, of course, illustrative and not restrictive.

At least some aspects of the present disclosure will now be described with reference to the following numbered clauses.

Clause 1. A method may include: identifying, by a processor, a plurality of identification numbers associated with a plurality of entities; determining, by the processor, a digital master key associated with a bank identification number; utilizing, by the processor, a derivation translation module to derive three digits of the plurality of digital digits associated with the digital master key; automatically generating, by the processor, a plurality of time-based digital tokens based on the three digits derived from the digital master key; utilizing, by the processor, a time-based digital token of the plurality of time-based digital tokens to generate digital data for with a computing device associated with a user; automatically calculating, by the processor, a first card verification code associated with the time-based digital token and the digital data for the computing device associated with the user; and automatically expiring, by the processor, the first card verification code after a predetermined period of time.

Clause 2. The method according to clause 1, where each entity of the plurality of entities represents a banking institution.

Clause 3. The method according to clause 1 or 2, where the digital master key is a pre-generated string of a plurality of digital digits.

Clause 4. The method according to clause 1, 2 or 3, where the digital data is account information associated with the user.

Clause 5. The method according to clause 1, 2, 3 or 4, where the automatically calculating the first verification code associated with the time-based digital token and the digital data includes: identifying a plurality of parameters associated with the digital data based on a plurality of received preferences associated with the user; assigning a value to each identified parameter of the plurality of parameters based on a predetermined scale; dynamically aggregating the assigned values of each identified parameter of the plurality of parameters associated with the user; and generating the first verification code based on the dynamic aggregation of the assigned values of the plurality of parameters associated with the user.

Clause 6. The method according to clause 1, 2, 3, 4 or 5, where the utilizing the derivation translation module further includes deriving at least nine digits from the digital master key.

Clause 7. The method according to clause 1, 2, 3, 4, 5 or 6, where the utilizing the derivation translation module further includes deriving two sets of digits from the digital master key to generate two time-based digital tokens.

Clause 8. The method according to clause 1, 2, 3, 4, 5, 6 or 7, where each set of the derived two sets of digits correlates with the first card verification code and the second card verification code.

Clause 9. The method according to clause 1, 2, 3, 4, 5, 6, 7 or 8, further including automatically displaying via a graphical user interface with a plurality of programmable elements the plurality of time-based digital tokens on the computing device associated with the user.

Clause 10. The method according to clause 1, 2, 3, 4, 5, 6, 7, 8 or 9, further including automatically updating a pre-generated database of data records associated with the digital data in response to generating the plurality of time-based tokens.

Clause 11. A method may include: identifying, by a processor, a plurality of identification numbers associated with a plurality of entities; determining, by the processor, a digital master key associated with a bank identification number; utilizing, by the processor, a derivation translation module to derive at least three digits of the plurality of digital digits associated with the digital master key; automatically generating, by the processor, a plurality of time-based digital tokens based on the three digits derived from the digital master key; automatically updating, by the processor, a pre-generated database of data records associated with the digital data in response to generating the plurality of time-based tokens; utilizing, by the processor, a time-based digital token of the plurality of time-based digital tokens to generate digital data for with a computing device associated with a user; automatically calculating, by the processor, a first card verification code associated with the time-based digital token and the digital data for the computing device associated with the user; automatically expiring, by the processor, the first card verification code after a predetermined period of time, and automatically regenerating, by the processor, a second card verification code after a predetermined period of time for the computing device associated with the user.

Clause 12. The method according to clause 11, where each entity of the plurality of entities represents a one banking institution.

Clause 13. The method according to clause 11 or 12, where the digital master key is a pre-generated string of a plurality of digital digits.

Clause 14. The method according to clause 11, 12 or 13, where the digital data is account information associated with the user.

Clause 15. The method according to clause 11, 12, 13 or 14, where the automatically calculating the first verification code associated with the time-based digital token and the digital data includes: identifying a plurality of parameters associated with the digital data based on a plurality of received preferences associated with the user; assigning a value to each identified parameter of the plurality of parameters based on a predetermined scale; dynamically aggregating the assigned values of each identified parameter of the plurality of parameters associated with the user; and generating the first verification code based on the dynamic aggregation of the assigned values of the plurality of parameters associated with the user.

Clause 16. The method according to clause 11, 12, 13, 14 or 15, where the utilizing the derivation translation module further includes deriving at least nine digits from the digital master key.

Clause 17. The method according to clause 11, 12, 13, 14, 15 or 16, further including automatically displaying, via a graphical user interface with a plurality of programmable elements, the plurality of time-based digital tokens on the computing device associated with the user.

Clause 18. A system may include: non-transient computer memory, storing software instructions; and a processor of a first computing device associated with a user; where, when the processor executes the software instructions, the first computing device is programmed to: identify, by the processor, a plurality of an identification numbers associated with a plurality of entities; determine, by the processor, a digital master key associated with a identification number; utilize, by the processor, a derivation translation module to derive at least three digits of the plurality of digital digits associated with the digital master key; automatically generate, by the processor, a plurality of time-based digital tokens based on the at least three digits derived from the digital master key; utilize, by the processor, a time-based digital token of the plurality of time-based digital tokens to generate digital data for with a computing device associated with a user; automatically generate, by the processor, a first card verification code associated with the time-based digital token and the digital data for the computing device associated with the user; and automatically expire, by the processor, the first card verification code after a predetermined period of time.

Clause 19. The system according to clause 18, where the software instructions further include automatically displaying, via a graphical user interface with a plurality of programmable elements, the plurality of time-based digital tokens on the computing device associated with the user.

Clause 20. The system according to clause 18 or 19, where the software instructions further include automatically updating a pre-generated database of data records associated with the digital data in response to generating the plurality of time-based tokens.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer-implemented method comprising:
identifying, by a processor, a plurality of identification numbers associated with a plurality of entities;
determining, by the processor, a digital master key associated with at least one identification number;
utilizing, by the processor, a derivation translation module to derive at least three digits of a plurality of digits associated with the digital master key;
automatically generating, by the processor, a time-based digital token based on the at least three digits derived from the digital master key;
utilizing, by the processor, the time-based digital token to generate digital data for a computing device associated with a user;
automatically generating, by the processor, a first card verification code associated with the at least one time-based digital token and the digital data for the computing device associated with the user, wherein automatically generating the first verification code comprises:
identifying a plurality of parameters associated with the digital data based on a plurality of preferences associated with the user;
assigning a value to each identified parameter of the plurality of parameters based on a predetermined scale;
dynamically aggregating the assigned values of each identified parameter of the plurality of parameters associated with the user; and
generating the first verification code based on the dynamic aggregation of the assigned values of the plurality of parameters associated with the user; and
automatically expiring, by the processor, the first card verification code after a predetermined period of time.

2. The computer-implemented method of claim 1, wherein each entity of the plurality of entities represents an institution.

3. The computer-implemented method of claim 1, wherein the digital master key is a pre-generated string of a plurality of digital digits.

4. The computer-implemented method of claim 1, wherein the digital data is account information associated with the user.

5. The computer-implemented method of claim 1, wherein the utilizing the derivation translation module further comprises deriving at least nine digits from the digital master key.

6. The computer-implemented method of claim 1, wherein the utilizing the derivation translation module further comprises deriving at least two sets of digits from the digital master key to generate at least two time-based digital tokens.

7. The computer-implemented method of claim 6, wherein each set of the derived two sets of digits correlates with the first card verification code and the second card verification code.

8. The computer-implemented method of claim 1, further comprising automatically displaying via at least one a graphical user interface with a plurality of programmable elements the plurality of time-based digital tokens on the computing device associated with the user.

9. The computer-implemented method of claim 1, further comprising automatically updating a pre-generated database of data records associated with the digital data in response to generating the plurality of time-based tokens.

10. A computer-implemented method comprising:
identifying, by a processor, a plurality of an identification numbers associated with a plurality of entities;
determining, by the processor, at least one digital master key associated with an identification number;
utilizing, by the processor, a derivation translation module to derive at least three digits of the plurality of digital digits associated with the digital master key;
automatically generating, by the processor, a plurality of time-based digital tokens based on the at least three digits derived from the digital master key;
automatically updating, by the processor, a pre-generated database of data records associated with the digital data in response to generating the plurality of time-based tokens;
utilizing, by the processor, a time-based digital token of the plurality of time-based digital tokens to generate digital data for with a computing device associated with a user;
automatically generating, by the processor, a first card verification code associated with the at least one time-based digital token and the digital data for the computing device associated with the user, wherein automatically generating the first verification code comprises:
identifying a plurality of parameters associated with the digital data based on a plurality of preferences associated with the user;
assigning a value to each identified parameter of the plurality of parameters based on a predetermined scale;
dynamically aggregating the assigned values of each identified parameter of the plurality of parameters associated with the user; and
generating the first verification code based on the dynamic aggregation of the assigned values of the plurality of parameters associated with the user;
automatically expiring, by the processor, the first card verification code after a predetermined period of time; and
automatically regenerating, by the processor, a second card verification code after the predetermined period of time for the computing device associated with the user.

11. The computer-implemented method of claim 10, wherein each entity of the plurality of entities represents at least one institution.

12. The computer-implemented method of claim 10, wherein the digital master key is a pre-generated string of a plurality of digital digits.

13. The computer-implemented method of claim 10, wherein the digital data is account information associated with the user.

14. The computer-implemented method of claim 10, wherein the utilizing the derivation translation module further comprises deriving at least nine digits from the digital master key.

15. The computer-implemented method of claim 10, further comprising automatically displaying, via at least one a graphical user interface with a plurality of programmable elements, the plurality of time-based digital tokens on the computing device associated with the user.

16. A system comprising:

a non-transient computer memory, storing software instructions;

at least one processor of a first computing device associated with a user;

wherein, when the processor executes the software instructions, the first computing device is programmed to:

identify, by the processor, a plurality of identification numbers associated with a plurality of entities;

determine, by the processor, at least one digital master key associated with an identification number;

utilize, by the processor, a derivation translation module to derive at least three digits of the plurality of digital digits associated with the digital master key;

automatically generate, by the processor, a plurality of time-based digital tokens based on the at least three digits derived from the digital master key;

utilize, by the processor, at least one time-based digital token of the plurality of time-based digital tokens to generate digital data for with a computing device associated with a user;

automatically generate, by the processor, a first card verification code associated with the at least one time-based digital token and the digital data for the computing device associated with the user, wherein automatically generating the first verification code comprises:

identifying a plurality of parameters associated with the digital data based on a plurality of preferences associated with the user;

assigning a value to each identified parameter of the plurality of parameters based on a predetermined scale;

dynamically aggregating the assigned values of each identified parameter of the plurality of parameters associated with the user; and generating the first verification code based on the dynamic aggregation of the assigned values of the plurality of parameters associated with the user;

automatically expire, by the processor, the first card verification code after a predetermined period of time; and automatically regenerate, by the processor, a second card verification code after the predetermined period of time for the computing device associated with the user.

17. The system of claim 16, wherein the software instructions further comprise automatically displaying, via at least one a graphical user interface with a plurality of programmable elements, the plurality of time-based digital tokens on the computing device associated with the user.

18. The system of claim 16, wherein the software instructions further comprise automatically updating a pre-generated database of data records associated with the digital data in response to generating the plurality of time-based tokens.

* * * * *